(12) United States Patent
Elder et al.

(10) Patent No.: US 7,605,492 B2
(45) Date of Patent: Oct. 20, 2009

(54) POWER SUPPLY SYSTEM AND METHOD FOR SUPPLYING POWER TO A VEHICLE

(75) Inventors: Ronald Elder, Livonia, MI (US); Michael Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 182 days.

(21) Appl. No.: 11/379,588

(22) Filed: Apr. 21, 2006

(65) Prior Publication Data

US 2007/0247003 A1    Oct. 25, 2007

(51) Int. Cl.
*B60L 1/00* (2006.01)
*H02H 7/18* (2006.01)
*H02J 1/10* (2006.01)
*H02J 7/00* (2006.01)

(52) U.S. Cl. .................... 307/9.1; 307/10.7; 307/18; 307/23; 307/29; 307/44; 307/45; 307/46; 307/48; 307/80; 320/135

(58) Field of Classification Search ............. 307/9.1, 307/10.7, 18, 23, 29, 44, 45, 46, 48, 80; 320/135
See application file for complete search history.

(56) References Cited

U.S. PATENT DOCUMENTS

| | | | |
|---|---|---|---|
| 5,710,504 A | 1/1998 | Pascual et al. | |
| 5,931,245 A | 8/1999 | Uetake et al. | |
| 6,281,662 B1 | 8/2001 | Flohr | |
| 6,452,361 B2 * | 9/2002 | Dougherty et al. | 320/104 |
| 6,707,271 B2 * | 3/2004 | Kitagawa | 320/134 |
| 6,727,602 B2 * | 4/2004 | Olson | 370/46 |
| 6,801,014 B1 | 10/2004 | Chitsazan et al. | |
| 7,061,138 B2 * | 6/2006 | Richter et al. | 307/10.7 |
| 7,157,882 B2 * | 1/2007 | Johnson et al. | 320/134 |
| 7,489,110 B2 * | 2/2009 | Stanesti et al. | 320/135 |
| 2002/0190690 A1 | 12/2002 | Tamai et al. | |
| 2004/0178756 A1 | 9/2004 | Zhenxing | |
| 2005/0029987 A1 | 2/2005 | Lin et al. | |
| 2005/0077875 A1 | 4/2005 | Bohley | |
| 2005/0275372 A1 * | 12/2005 | Crowell | 320/112 |
| 2006/0058897 A1 * | 3/2006 | Senda et al. | 700/22 |
| 2006/0097576 A1 | 5/2006 | Kobayashi et al. | |

FOREIGN PATENT DOCUMENTS

GB    2342515 A    4/2000

* cited by examiner

*Primary Examiner*—Albert W Paladini
*Assistant Examiner*—Hal I Kaplan
(74) *Attorney, Agent, or Firm*—David B. Kelley; Brooks Kushman P.C.

(57) ABSTRACT

A power supply system is provided that can operate with energy storage units of varying voltages and temperatures, that can correct voltage and temperature deviations, and that can continue to provide power when an energy storage unit is inoperable. A power supply system is also provided that can recondition an energy storage unit during vehicle operation.

18 Claims, 3 Drawing Sheets

POWER SUPPLY SYSTEM AND METHOD FOR SUPPLYING POWER TO A VEHICLE

BACKGROUND OF THE INVENTION

1. Field of the Invention

The invention generally relates to a system and method for supplying power to a vehicle.

2. Background Art

Hybrid electric vehicles and fuel cell vehicles may use an electrical energy storage system to provide electrical energy to the vehicle and to capture electrical energy generated by the vehicle such as during a braking event.

A high voltage battery system is an example of one such electrical energy storage system. A high voltage battery system can include a number of series connected energy storage units, or modules. Each module may contain one or more series connected energy storage cells, or batteries.

Because of the battery and module series connections, the performance of a high voltage battery system is generally limited by the performance of the battery with the lowest voltage. As a result, the batteries used in a high voltage battery system are generally selected such that their voltages are approximately equal, e.g., within a few milli-volts of each other. Such selection allows the high voltage battery system to operate without being limited by a lowest-voltage battery.

Once a high voltage battery system has been exposed to various current levels and temperature conditions, the battery voltages may deviate from each other. This voltage deviation may impact the performance of the high voltage battery system and thus impact overall vehicle performance and fuel economy.

Temperature deviations between batteries may also affect high voltage battery system performance and thus vehicle performance. Some high voltage battery system designs attempt to minimize temperature differences by locating the modules within close proximity of each other in order to facilitate thermal management. This strategy, however, may limit design and packaging options.

If a battery of a high voltage battery system becomes inoperable, the vehicle may be disabled or its performance may be significantly reduced until a replacement battery is installed.

Reconditioning of a high voltage battery system generally requires that the entire system be charged up to, for example, approximately 100% state of charge, discharged to approximately 10% state of charge, and then recharged back to approximately 50% state of charge. This procedure removes most battery memory effects and reduces voltage and state of charge deviations between batteries. Because of the battery and module series connections, the effectiveness of this reconditioning procedure is limited by, during discharge, the weakest battery, i.e., the battery with the lowest state of charge, and limited by, during charge, the strongest battery, i.e., the battery with the highest state of charge. Reconditioning of a high voltage battery system cannot be performed while the vehicle is in operation. Reconditioning of a high voltage battery system typically takes place at a vehicle service center.

A power supply system is desired that can operate with energy storage units of varying voltages and temperatures, that can correct voltage and temperature deviations, and that can continue to provide power when an energy storage unit is inoperable. A power supply system is also desired that can recondition an energy storage unit during vehicle operation.

Background information may be found in U.S. Pat. Nos. 5,710,504; 5,931,245; 6,281,662 B1; and 6,801,014 B1.

Background information may be found in U.S. Patent Application Publication Numbers: 2005/0029987 A1 and 2005/0077875 A1.

SUMMARY OF THE INVENTION

An aspect of the invention provides a power supply system for a vehicle including an electrical system arrangement configured to receive and output electrical energy. The power supply system includes first and second energy storage units. Each of the units is capable of receiving and storing electrical energy. Each of the units is further capable of outputting electrical energy. The power supply system also includes an electrical converter connected to the first and second energy storage units and the electrical system arrangement. The first and second energy storage units are connected to the converter in an electrical circuit such that the first and second energy storage units are capable of being connected in parallel to each other and the converter. The converter is operable to receive energy from the first and second energy storage units. The converter is also operable to facilitate a transfer of the energy received from the first and second energy storage units to the electrical system arrangement. The power supply system further includes a control system in communication with the converter and includes at least one controller. The control system is configured to determine information related to at least one respective operating characteristic of each of the first and second energy storage units. The control system is also configured to control the energy transferred from each of the first and second energy storage units at least partly in response to the at least one respective operating characteristic.

The converter may be configured to facilitate a transfer of energy from the first energy storage unit to the electrical system arrangement independently of a transfer of energy from the second energy storage unit to the electrical system arrangement.

The converter may be operable to inhibit a transfer of energy from the first and second energy storage units to the electrical system arrangement.

The converter may be operable to facilitate a transfer of energy from the first energy storage unit to the electrical system arrangement while inhibiting a transfer of energy from the second energy storage unit to the electrical system arrangement.

The converter may be operable to facilitate a substantially concurrent transfer of energy from the first and second energy storage units to the electrical system arrangement.

The control system may be configured to control the amount of energy transferred from each of the first and second energy storage units such that the amount of energy transferred from the first energy storage unit is different from the amount of energy transferred from the second energy storage unit.

The converter may be operable to receive energy from the electrical system arrangement, and to facilitate a transfer of the energy received from the electrical system arrangement to the first and second energy storage units.

The control system may be configured to control the amount of energy transferred to the first and second energy storage units at least partly in response to the at least one respective operating characteristic.

The at least one respective operating characteristic may include a determined voltage of the first and second energy storage units.

The control system may be configured to control the amount of energy transferred to the first and second energy storage units based on the determined voltages.

The power supply system may include a third energy storage unit in the electrical circuit capable of being connected in parallel to the converter and either or both of the first and second energy storage units.

The converter may be configured to facilitate a transfer of at least some of the energy received from the electrical system arrangement to the third energy storage unit when the amount of energy received by the converter from the electrical system arrangement exceeds a predetermined threshold.

Each of the first and second energy storage units may include a respective nominal voltage.

The first and second energy storage units may have different nominal voltages.

The operating characteristic may include at least one of a voltage, a temperature, or a state of charge.

An aspect of the invention provides a power supply system for a vehicle including at least one electrical load connected to an electrical bus. The power supply system includes a plurality of battery modules. Each of the battery modules includes at least one battery cell. The power supply system also includes an electrical converter connected to the electrical bus and the battery modules. The converter is operable to transfer energy from each of the battery modules to the electrical bus. The power supply system further includes a control system in communication with the converter and includes at least one controller. The control system is configured to determine information related to at least one respective operating characteristic of each of the battery modules. The control system is also configured to independently control the energy transferred from each of the battery modules at least partly in response to the at least one respective operating characteristic.

The battery modules may be connected to the converter in an electrical circuit such that the battery modules are capable of being connected in parallel to each other and the converter.

The vehicle may include an electric machine connected to the electrical bus.

The electric machine may be operable to output electrical energy to the electrical bus.

The converter may be operable to receive energy from the electrical bus and to facilitate a transfer of the energy received from the electrical bus to at least one of the battery modules.

The control system may be configured to control the amount of energy transferred to the at least one battery module at least partly in response to the at least one respective operating characteristic.

The operating characteristic may include at least one of a state of charge, a voltage, or a temperature.

The power supply system may include a capacitor being connected to the converter and at least one of the battery modules in an electrical circuit such that the capacitor is capable of being connected in parallel to the converter and the at least one battery module.

The control system may be configured to determine whether the energy received by the converter from the electrical bus exceeds a predetermined threshold.

The converter may be operable to facilitate a transfer of at least a portion of the energy received from the electrical bus to the capacitor when the energy received by the converter from the electrical bus exceeds the predetermined threshold.

An aspect of the invention provides a method of providing power to a vehicle including first and second energy storage units and an electrical system arrangement configured to receive and output electrical energy. The method includes monitoring at least one respective operating characteristic of each of the first and second energy storage units. The method also includes selectively transferring energy from the first energy storage unit to the electrical system arrangement, and selectively transferring energy from the second energy storage unit to the electrical system arrangement. The method further includes controlling the selective transferring of energy from each of the first and second energy storage units at least partly in response to the at least one respective operating characteristic.

The method may include determining if the at least one operating characteristic of each of the energy storage units meets a predetermined condition.

The at least one operating characteristic may include at least one of a state of charge, a voltage, or a temperature.

The predetermined condition may include at least one of a range of states of charge, a range of voltages, or a range of temperatures.

The method may include reducing the amount of energy selectively transferred from the first energy storage unit to the electrical system arrangement when the state of charge of the first energy storage unit does not meet the range of states of charge.

The method may include determining whether the electrical system arrangement is outputting electrical energy.

The method may include selectively transferring at least a portion of the energy outputted by the electrical system arrangement to the first energy storage unit when the electrical system arrangement is outputting energy.

The amount of energy selectively transferred from the first energy storage unit to the electrical system arrangement may be generally less than the amount of energy selectively transferred from the second energy storage unit to the electrical system arrangement.

Embodiments of the present invention provide for independent control over the current allowed to flow from or to each of the energy storage units within the power supply system; bypassing of inoperable energy storage units while providing continuous power for vehicle operation; and packaging alternatives for energy storage units within a vehicle.

An embodiment of a control system in communication with an electrical converter can be configured to determine the voltage, state of charge, or temperature of each energy storage unit of the power supply system.

An embodiment of an electrical converter allows for individual currents to flow to and from each of the energy storage units based on the voltage, state of charge, or temperature, of each energy storage unit of the power supply system.

In an embodiment of the invention, independent control over each of the energy storage units, in response to energy storage unit temperature, allows the energy storage units to be placed in locations within the vehicle with different thermal characteristics.

In an embodiment of the invention, independent control over each of the energy storage units, in response to energy storage unit voltage or state of charge, allows the power supply system to efficiently use energy storage units of differing voltages, and consequently differing sizes.

In an embodiment of the invention, an energy storage unit can act as a "replacement unit" and be placed in a location within the vehicle that allows for easy replacement. This unit can be exposed to proportionately higher current levels compared to the other energy storage units. At these relatively higher current levels, the "replacement unit" would have a shorter life but the useful life of the other energy storage units would be extended.

In an embodiment the invention, when the vehicle is started, the control system determines the voltage of each of the energy storage units of the power supply system. Based on these voltages, the power supply system adjusts the current drawn from each energy storage unit such that the unit with the least amount of stored energy, i.e., the weakest unit, experiences a decrease in current draw, while the energy storage unit with the most amount of stored energy, i.e., the strongest unit, experiences an increase in current draw. Other energy storage units experience a current draw between that of the weakest and strongest energy storage units.

In an embodiment of the invention, when the vehicle is braking, i.e., experiencing a power recharge event, the electrical converter would divide the current received from an electric machine such that the weakest energy storage unit would be exposed to the highest current input, while the strongest energy storage unit would be exposed to the lowest current input. Other energy storage units would be exposed to a current input somewhere between the highest and lowest current inputs.

In an embodiment of the invention, if the voltage of an energy storage unit cannot be maintained within a desired range, e.g., a unit becomes inoperable, the power supply system would by-pass that energy storage unit and increase the current draw from the remaining energy storage units to support continued vehicle operation.

In an embodiment of the invention, the power supply system includes a capacitor electrically connected to an electrical converter. During a power recharge event, e.g., during panic braking, the capacitor would capture current spikes generated by an electric machine that energy storage units would be unable to contain. This strategy captures regenerative energy while reducing the possibility of overcharging the energy storage units.

In an embodiment of the invention, the power supply system allows for a unique current to separately recondition each energy storage unit during vehicle operation. This procedure improves the effectiveness of the reconditioning process because it reduces the impact of the weakest and strongest energy storage units on the reconditioning process.

In an embodiment of the invention, a power supply system includes a control system and energy storage units.

The control system determines the voltage and state of charge of each energy storage unit. The control system then determines whether the state of charge for each energy storage unit falls within a predetermined range of states of charge. The predetermined range of states of charge may be different for each energy storage unit.

If, for a given energy storage unit, the state of charge falls within the predetermined range of states of charge, the control system does not adjust the current level being drawn from or delivered to that energy storage unit.

If, for a given energy storage unit, the state of charge does not fall within the predetermined range of states of charge, the control system adjusts the current level being drawn from or delivered to that energy storage unit in an attempt to alter the state of charge such than it falls within the predetermined range of states of charge.

After the current level is adjusted, the control system determines whether the state of charge for that energy storage unit falls within the predetermined range of states of charge. If the state of charge falls within the predetermined range of states of charge, the control system does not adjust the current level being drawn from or delivered to that energy storage unit. If the state of charge does not fall within the predetermined range of states of charge, the control system adjusts the current level being drawn from or delivered to that energy storage unit in an attempt to alter the state of charge such than it falls within the predetermined range of states of charge.

The control system will adjust the current level for a given energy storage unit up to a limited number of times, e.g., five (5) times, in an attempt to alter the state of charge such that it falls within the predetermined range of states of charge.

If, after five (5) attempts, the state of charge does not fall within the predetermined range of states of charge, the control system adjusts an allowable voltage and thus the current drawn from or delivered to the other energy storage units. The allowable voltage of each energy storage unit may be different. The control system then retains information that energy storage unit service is needed.

In an embodiment of the invention, a power supply system includes a control system, an electrical converter, energy storage units, and a capacitor.

The control system determines the voltage and state of charge of each energy storage unit. The control system then determines whether the state of charge for each energy storage unit falls within a predetermined range of states of charge. The predetermined range of states of charge may be different for each energy storage unit. The control system then determines whether there is a current generated by the electric machine being delivered to the electrical converter that exceeds the energy storage units current handling capabilities.

If the current exceeds the energy storage units current handling capabilities, the electrical converter directs the largest portion of the current being generated by the electric machine to the capacitor. The electrical converter divides the remaining portion of the current being generated by the electric machine between the energy storage units.

DETAILED DESCRIPTION OF THE PREFERRED EMBODIMENT(S)

Figure 1:
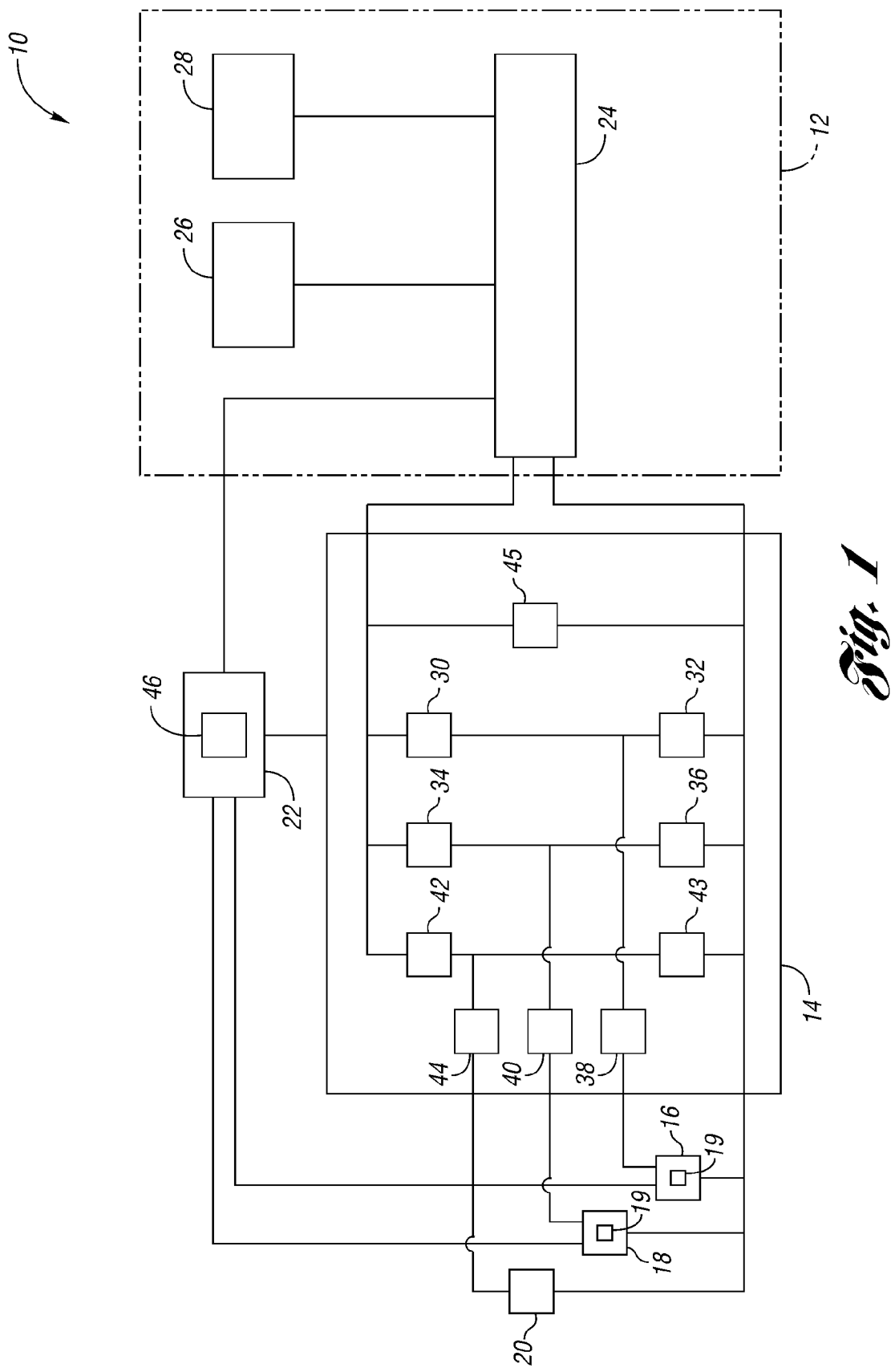
FIG. 1 is a block diagram of a system in accordance with one embodiment of the present invention.

FIG. 1 shows a power supply system 10 for a vehicle (not shown). The power supply system 10 includes an electrical system arrangement 12, an electrical converter 14, first and second battery modules 16, 18, or energy storage units, a capacitor 20, and a control system 22.

The electrical system arrangement 12 includes an electrical bus 24, an electric load 26, and an electric machine 28, such as an electric motor. The electric machine 28 is capable of outputting electrical energy to the electrical bus 24.

The battery modules 16, 18 are each capable of receiving and storing electrical energy from the electrical converter 14. The battery modules 16, 18 are also capable of outputting electrical energy to the electrical converter 14.

In the embodiment of FIG. 1, there are two battery modules 16, 18. Any number of battery modules, however, may be used.

In the embodiment of FIG. 1, each of the battery modules 16, 18 contains a single battery cell 19. The nominal voltages of each of the battery modules 16, 18 are thus approximately equal. The battery modules 16, 18, however, may contain a different number of battery cells 19 and may thus have different nominal voltages. For example, battery module 16 may contain three (3) battery cells 19 while battery module 18 may contain two (2) battery cells 19.

Because the power supply system 10 allows for battery modules 16, 18 of differing sizes and thus differing nominal voltages, the power supply system 10 offers flexibility with respect to battery cell 19 selection and packaging.

The electrical converter 14 is connected to the battery modules 16, 18 and the electrical system arrangement 12 in an electrical circuit such that the battery modules 16, 18 may be connected in parallel to each other and the electrical converter 14 with respect to the electrical system arrangement 12.

Depending upon the state of electrical switches 30, 32, and 34, 36, the battery modules 16, 18 may or may not be connected in parallel to each other and the electrical converter 14. For example, when switch 30 is closed and switches 32, 34, and 36 are open, battery module 16 is connected in parallel to the electrical converter 14 with respect to the electrical system arrangement 12. When switches 30 and 34 are closed and switches 32 and 36 are open, battery modules 16, 18 are connected in parallel to each other and the electrical converter 14 with respect to the electrical system arrangement 12.

The electrical converter 14 facilitates the independent transfer of energy, or current, received from each of the battery modules 16, 18 to the electrical system arrangement 12 by the selective toggling of switches 30, 32 and 34, 36. The switches 30, 32 and 34, 36 are toggled with a frequency in the megaHertz (MHZ) range, e.g., 5 MHZ. For example, when the electrical system arrangement 12 presents a load to the electrical converter 14, switch 32 can be closed and switch 30 can be opened to allow current from battery module 16 to charge inductor 38. Switch 30 can then be closed and switch 32 opened to allow current to flow from inductor 38 to the electrical system arrangement 12. Switches 34, 36 can be similarly toggled to facilitate the transfer of current from battery module 18 to the electrical system arrangement 12.

The selective toggling of switches 30, 32 and 34, 36 of electrical converter 14 can facilitate a transfer of current from the first battery module 16 to the electrical system arrangement 12 while inhibiting a transfer of current from the second battery module 18 to the electrical system arrangement 12. For example, switches 30, 32 can be toggled as described above to facilitate the transfer of current from battery module 16 to the electrical system arrangement 12, while switches 34, 36 remain open. The selective toggling of switches 30, 32 and 34, 36 can thus also facilitate a substantially concurrent transfer of energy from the battery modules 16, 18 to the electrical system arrangement 12.

Electrical contacts (not shown) may be placed in the electrical connections between each of the battery modules 16, 18 and the electrical converter 14 such that, for example, when the electrical contact associated with battery module 18 is open, no current is allowed to flow to or from the battery module 18. Battery module 18 can be thus be bypassed.

The electrical converter 14 also facilitates the independent transfer of current received from the electrical system arrangement 12 to each of the battery modules 16, 18 by the selective toggling of switches 30, 32 and 34, 36. For example, when the electric machine 28 is outputting current to the electric bus 24, switch 30 can be closed and switch 32 opened to allow at least a portion of the current from the electric bus 24 to charge inductor 38. Switch 32 can then be closed and switch 30 opened to allow current to flow from inductor 38 to battery module 16. Switches 34, 36 can be similarly toggled to facilitate the transfer of at least a portion of the current from the electric bus 24 to battery module 18.

The selective toggling of switches 30, 32, and 34, 36 of electrical converter 14 can thus facilitate a transfer of at least a portion of the current from the electric bus 24 to either or both of the battery modules 16, 18.

In the embodiment of FIG. 1, the electrical converter 14 is implemented with electrical switches 30, 32 and 34, 36 and inductors 38, 40. The electrical converter 14, however, may also be implemented with field effect transistors or other components that would act to facilitate the independent transfer of current between the battery modules 16, 18 and the electrical system arrangement 12.

The capacitor 20, or energy storage unit, is capable of receiving and storing current from the electrical converter 14. The capacitor 20 is also capable of outputting electrical energy to the electrical converter 14.

The capacitor 20 is connected to the electrical converter 14 in an electrical circuit such that the capacitor 20 is capable of being connected in parallel to the electrical converter 14 with respect to the electrical system arrangement 12. When switch 42 is closed and switch 43 is open, the capacitor 20 is connected in parallel to the electrical converter 14.

The electrical converter 14 facilitates the transfer of at least a portion of the current received from the electrical system arrangement 12 to the capacitor 20 by the selective toggling of switches 42, 43 with a frequency in the MHZ range, e.g., 5 MHz. When switch 42 is closed and switch 43 is open, at least a portion of the current received from the electrical system arrangement 12 charges inductor 44. When switch 42 is opened and switch 43 is closed, current from inductor 44 flows to the capacitor 20.

The electrical converter 14 includes a capacitor 45. Capacitor 45 reduces current ripple.

The control system 22 is in communication with the electric bus 24, the electrical converter 14, and the battery modules 16, 18. The control system 22 includes a controller 46. In the embodiment of FIG. 1, the controller 46 is located within the control system 22. The controller 46, however, may be located within the electrical converter 14 or elsewhere in the vehicle. The controller 46 may also comprise several controllers (not shown) located throughout the vehicle.

The control system 22 is configured to control switches 30, 32, 34, 36, and 42. The controller 46 thus controls the current passed between the battery modules 16, 18, the capacitor 20, and the electrical system arrangement 12. For example, the controller 46 can control the switches 30, 32 and 34, 36 such that the current transferred from battery module 16 is generally different, e.g., lower, than the current transferred from battery module 18. This control strategy can extend the life of battery module 16 relative to battery module 18.

The control system 22 is configured to determine information related to at least one respective operating characteristic of each of the battery modules 16, 18. The operating characteristic can include a state of charge, voltage, or temperature. The control system 22 is also configured to determine whether the electrical system arrangement 12 is outputting current and whether the current output by the electrical system arrangement 12 exceeds a predetermined threshold.

When the control system 22 determines that the current output by the electrical system arrangement 12 exceeds the predetermined threshold, the electrical converter 14 can facilitate the transfer of a least a portion of that current to the capacitor 20 as described above.

The control system 22 is further configured to independently control the current passed between the battery modules 16, 18 and the electrical system arrangement 12 at least party in response to the operating characteristic. For example, the control system 22 can determine the state of charge of battery module 16 and then determine whether that state of charge falls within an acceptable range of states of charge. If the state of charge is below the acceptable range of states of charge, the control system 22 may reduce or eliminate the current flow from battery module 16 until the state of charge falls within the acceptable range of states of charge. Likewise, if the state of charge is above the acceptable range of states of charge, the control system may increase the current flow from battery module 16 until the state of charge falls within the acceptable range.

The power supply system 10 can independently recondition battery modules 16, 18. The control system 22 can control the current passed between the battery module 16 and electrical system arrangement 12, via the toggling of switches 30, 32 such that battery module 16 achieves a first desired state of charge, e.g., 100%, then achieves a second desired state of charge, e.g., 10%, and finally achieves a third desired state of charge, e.g., 50%. Battery module 18 can be reconditioned in a similar fashion.

The reconditioning of battery module 16 or 18 can occur while the vehicle is operating. If battery module 16 is being reconditioned, for example, the current needs of the electrical system 12 can be satisfied by battery module 18 using the methods of control described above.

Figure 2:
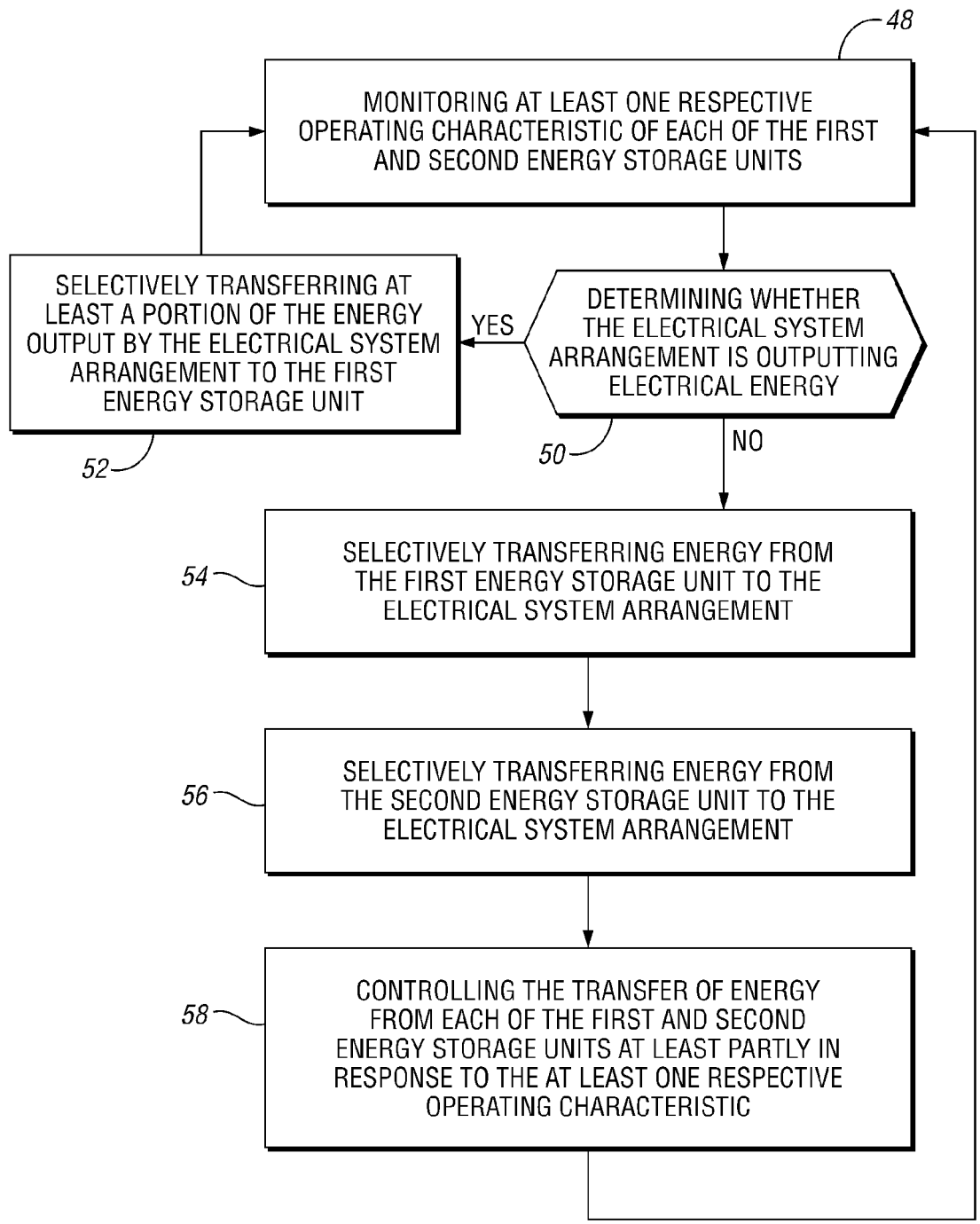
FIG. 2 is a flow chart illustrating a method in accordance with one embodiment of the present invention.

FIG. 2 is a flow chart of a method of providing power to a vehicle including first and second energy storage units and an electrical system arrangement configured to receive and output electrical energy. At block 48, a power supply system monitors at least one respective operating characteristic of each of the first and second energy storage units. At block 50, the power supply system determines whether the electrical system arrangement is outputting electrical energy. If the electrical system arrangement is outputting electrical energy, at block 52, the power supply system selectively transfers at least a portion of the energy output by the electrical system arrangement to the first energy storage unit. If the electrical system arrangement is not outputting electrical energy, at block 54, the power supply system selectively transfers energy from the first energy storage unit to the electrical system arrangement. At block 56, the power supply system selectively transfers energy from the second energy storage unit to the electrical system arrangement. At block 58, the power supply system controls the transfer of energy from each of the first and second energy storage units at least partly in response to the at least one respective operating characteristic.

Figure 3:
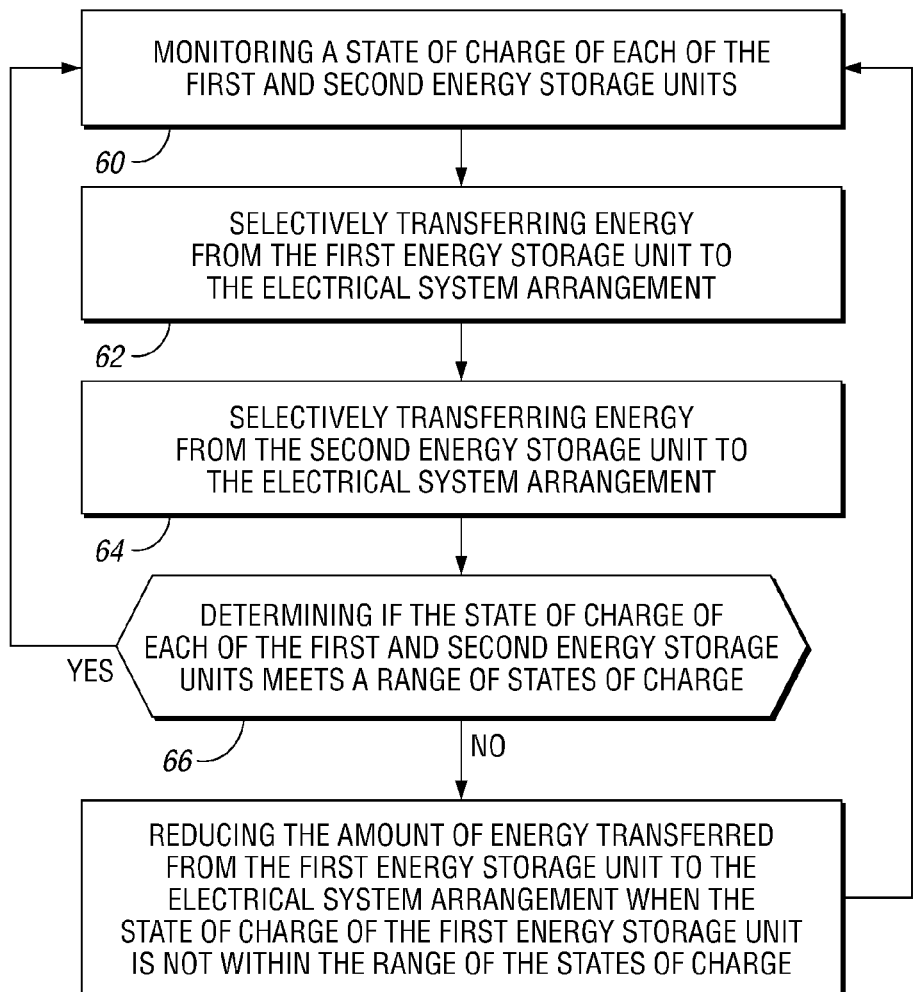
FIG. 3 is a flow chart illustrating a method in accordance with another embodiment of the present invention.

FIG. 3 is a flowchart of a method of providing power to a vehicle including first and second energy storage units and an electrical system arrangement configured to receive and output electrical energy. At block 60, a power supply system monitors at least one of a state of charge, a voltage, or a temperature of each of the first and second energy storage units. At block 62, the power supply system selectively transfers energy from the first energy storage unit to the electrical system arrangement. At block 64, the power supply system selectively transfers energy from the second energy storage unit to the electrical system arrangement. At block 66, the power supply system determines if the at least one of a state of charge, a voltage, or a temperature of each of the first and second energy storage units meets a respective range of states of charge, a range of voltages, or a range of temperatures. At block 68, the power supply system reduces the amount of energy transferred from the first energy storage unit to the electrical system arrangement when the state of charge of the first energy storage unit is not within the range of states of charge.

Figure 4:
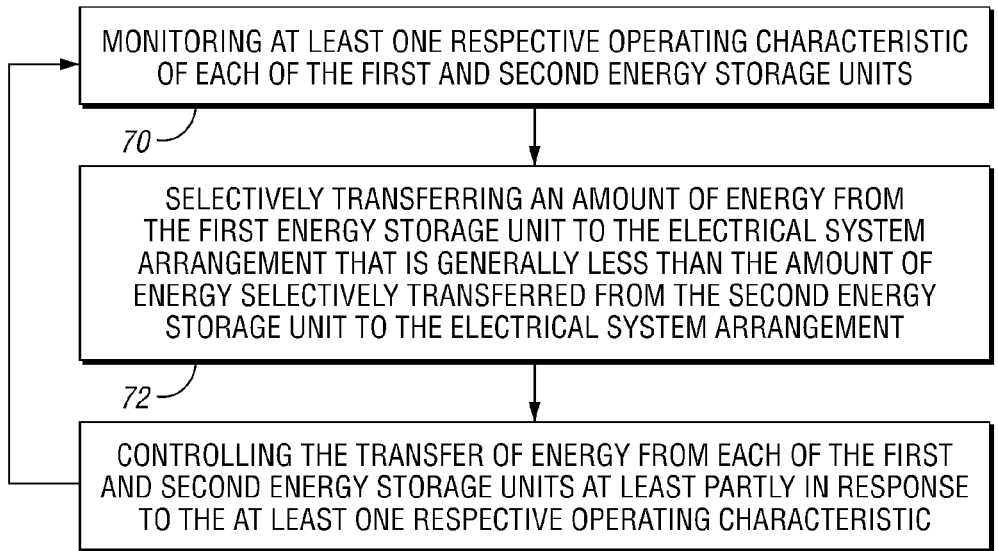
FIG. 4 is a flow chart illustrating a method in accordance with a third embodiment of the present invention.

FIG. 4 is a flow chart of a method of providing power to a vehicle including first and second energy storage units and an electrical system arrangement configured to receive and output electrical energy. At block 70, a power supply system monitors at least one respective operating characteristic of each of the first and second energy storage units. At block 72, the power supply system selectively transfers an amount of energy from the first energy storage unit to the electrical system arrangement that is generally less than an amount of energy selectively transferred from the second energy storage unit to the electrical system arrangement. At block 74, the power supply system controls the transfer of energy from each of the first and second energy storage units at least partly in response to the at least one respective operating characteristic.

While the best mode for carrying out the invention has been described in detail, those familiar with the art to which this invention relates will recognize various alternative designs and embodiments for practicing the invention as defined by the following claims.

What is claimed:

1. A power supply system for a vehicle including an electrical system arrangement configured to receive and output electrical energy, the power supply system comprising:
   first and second energy storage units, each of the units being capable of receiving and storing electrical energy, and further capable of outputting electrical energy; and
   an electrical converter connected to the first and second energy storage units and the electrical system arrangement, the first and second energy storage units being connected to the converter in an electrical circuit such that the first and second energy storage units are selectively electrically connected in parallel to each other and the converter, the converter being operable to receive energy from the first and second energy storage units and to concurrently transfer the energy received from the first and second energy storage units at differing rates to the electrical system arrangement; and
   a control system in communication with the converter and including at least one controller, the control system being configured to determine information related to at least one respective operating characteristic of each of the first and second energy storage units, and to independently control the respective rates of energy transferred from each of the first and second energy storage units at least partly in response to the at least one respective operating characteristic.

2. The power supply system of claim 1, wherein the converter is further operable to inhibit a transfer of energy from the first and second energy storage units to the electrical system arrangement, the converter being operable to facilitate a transfer of energy from the first energy storage unit to the electrical system arrangement while inhibiting a transfer of energy from the second energy storage unit to the electrical system arrangement.

3. The power supply system of claim 1, wherein the control system is configured to control the amount of energy transferred from each of the first and second energy storage units such that the amount of energy transferred from the first energy storage unit is different from the amount of energy transferred from the second energy storage unit.

4. The power supply system of claim 1, wherein the converter is further operable to receive energy from the electrical system arrangement, and to facilitate a transfer of the energy received from the electrical system arrangement to the first and second energy storage units, the control system being further configured to control the amount of energy transferred to the first and second energy storage units at least partly in response to the at least one respective operating characteristic.

5. The power supply system of claim 4, wherein the at least one respective operating characteristic includes a determined voltage of the first and second energy storage units, the control system being configured to control the amount of energy transferred to the first and second energy storage units based on the determined voltages, thereby facilitating a reconditioning of each of the first and second energy storage units separately from the other.

6. The power supply system of claim 4, further comprising a third energy storage unit in the electrical circuit capable of being connected in parallel to the converter and either or both of the first and second energy storage units, the converter being further configured to facilitate a transfer of at least some of the energy received from the electrical system arrangement to the third energy storage unit when the amount of energy received by the converter from the electrical system arrangement exceeds a predetermined threshold.

7. The power supply system of claim 1, wherein each of the first and second energy storage units includes a respective nominal voltage, and wherein the first and second energy storage units have different nominal voltages.

8. The power supply system of claim 1, wherein the operating characteristic includes at least one of a voltage, a temperature, or a state of charge.

9. A power supply system for a vehicle including at least one electrical load connected to an electrical bus, the power supply system comprising:
 a plurality of battery modules, each of the battery modules including at least one battery cell; and
 an electrical converter connected to the electrical bus and the battery modules, the converter being operable to transfer energy from each of the battery modules to the electrical bus at differing rates; and
 a control system in communication with the converter and including at least one controller, the control system being configured to determine information related to at least one respective operating characteristic of each of the battery modules, and to independently control the respective rates of energy transferred from each of the battery modules at least partly in response to the at least one respective operating characteristic.

10. The system of claim 9, wherein the battery modules are connected to the converter in an electrical circuit such that the battery modules are capable of being connected in parallel to each other and the converter.

11. The system of claim 9, the vehicle further including an electric machine connected to the electrical bus, the electric machine operable to output electrical energy to the electrical bus, wherein the converter is further operable to receive energy from the electrical bus and to facilitate a transfer of the energy received from the electrical bus to at least one of the battery modules, the control system being further configured to control the amount of energy transferred to the at least one battery module at least partly in response to the at least one respective operating characteristic.

12. The system of claim 11, wherein the operating characteristic includes at least one of a state of charge, a voltage, or a temperature.

13. The system of claim 11, further comprising a capacitor being connected to the converter and at least one of the battery modules in an electrical circuit such that the capacitor is capable of being connected in parallel to the converter and the at least one battery module, wherein the control system is further configured to determine whether the energy received by the converter from the electrical bus exceeds a predetermined threshold, the converter further operable to facilitate a transfer of at least a portion of the energy received from the electrical bus to the capacitor when the energy received by the converter from the electrical bus exceeds the predetermined threshold.

14. A method of providing power to a vehicle, the vehicle including first and second energy storage units and an electrical system arrangement configured to receive and output electrical energy, the method comprising:
 monitoring at least one respective operating characteristic of each of the first and second energy storage units;
 concurrently transferring energy from the first and second energy storage units to the electrical system arrangement at differing rates; and
 independently controlling the selective transferring of energy from each of the first and second energy storage units at least partly in response to the at least one respective operating characteristic.

15. The method of claim 14, further comprising determining if the at least one operating characteristic of each of the energy storage units meets a predetermined condition, wherein the at least one operating characteristic includes at least one of a state of charge, a voltage, or a temperature, and wherein the predetermined condition includes at least one of a range of states of charge, a range of voltages, or a range of temperatures.

16. The method of claim 15, further comprising reducing the amount of energy selectively transferred from the first energy storage unit to the electrical system arrangement when the state of charge of the first energy storage unit does not meet the range of states of charge.

17. The method of claim 14, further comprising determining whether the electrical system arrangement is outputting electrical energy, and selectively transferring at least a portion of the energy outputted by the electrical system arrangement to the first energy storage unit when the electrical system arrangement is outputting energy.

18. The method of claim 14, wherein the amount of energy selectively transferred from the first energy storage unit to the electrical system arrangement is generally less than the amount of energy selectively transferred from the second energy storage unit to the electrical system arrangement, thereby extending the life of the first energy storage unit relative to the second energy storage unit.

* * * * *

UNITED STATES PATENT AND TRADEMARK OFFICE
CERTIFICATE OF CORRECTION

| | | |
|---|---|---|
| PATENT NO. | : 7,605,492 B2 | Page 1 of 1 |
| APPLICATION NO. | : 11/379588 | |
| DATED | : October 20, 2009 | |
| INVENTOR(S) | : Elder et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 178 days.

Signed and Sealed this

Fifth Day of October, 2010

David J. Kappos
*Director of the United States Patent and Trademark Office*